(12) United States Patent
Williams

(10) Patent No.: US 9,150,426 B2
(45) Date of Patent: Oct. 6, 2015

(54) FUSION PROCESS USING AN ALKALI METAL METALATE

(75) Inventor: Rodney Kieth Williams, Stacy, MN (US)

(73) Assignee: TUNDRA COMPOSITES, LLC, White Bear Lake, MN (US)

( * ) Notice: Subject to any disclaimer, the term of this patent is extended or adjusted under 35 U.S.C. 154(b) by 1809 days.

(21) Appl. No.: 11/952,335

(22) Filed: Dec. 7, 2007

(65) Prior Publication Data
US 2008/0226528 A1 Sep. 18, 2008

Related U.S. Application Data

(60) Provisional application No. 60/873,735, filed on Dec. 8, 2006.

(51) Int. Cl.
*H05B 6/10* (2006.01)
*H05B 6/22* (2006.01)
(Continued)

(52) U.S. Cl.
CPC .............. *C01G 41/00* (2013.01); *C03C 14/004* (2013.01); *C22B 1/00* (2013.01); *C22B 34/36* (2013.01);
(Continued)

(58) Field of Classification Search
CPC .. C01G 41/00; C03C 14/004; C03C 2214/14; F27B 14/14; F27B 14/061; F27B 14/10; C22B 34/36; C22B 1/00; H05B 6/36; H05B 6/24; H05B 6/20; H05B 6/18; Y02W 30/54
USPC .......... 219/604, 634, 630; 373/4, 7, 151, 152, 373/160, 159, 155, 27, 30, 146, 157, 156; 423/249, 594.13, 594.15, 594.7, 594.9, 423/594.12, 594.8, 263; 210/649; 75/392; 420/590; 422/186.01, 186.03; 65/33.9; 524/406
See application file for complete search history.

(56) References Cited

U.S. PATENT DOCUMENTS 2,313,044 A 3/1943 Brassert
2,485,851 A 10/1949 Stevens
(Continued)

FOREIGN PATENT DOCUMENTS

EP 0 551 056 A1 7/1993
FR 2 668 726 A1 5/1992
(Continued)

OTHER PUBLICATIONS

Lassner, Erik and Schubert, Wolf-Dieter, "Tungsten: Properties, Chemistry, Technology of the Element, Alloys, and Chemical Compounds," *Vienna University of Technology* (1999).
(Continued)

*Primary Examiner* — Hung D Nguyen
(74) *Attorney, Agent, or Firm* — Pauly, DeVries Smith & Deffner, LLC

(57) ABSTRACT

The product of a molten alkali metal metalate phase separation can be processed into a purified metal from a metal source. Metal sources include native ores, recycled metal, metal alloys, impure metal stock, recycle materials, etc. The method uses a molten alkali metal metalate as a process medium or solvent in purifying or extracting high value metal or metal oxides from metal sources. Vitrification methods using the silicate glass separation phase can be prepared as is or can be prepared with a particulate phase distributed throughout the silica glass phase and encapsulated and fixed within the continuous glass phase. Tungsten metal can be obtained from an alkali metal tungstate. A typically finely divided tungsten metal powder can be obtained from a variety of tungsten sources including recycled tungsten scrap, tungsten carbide scrap, low grade tungsten ore typically comprising tungsten oxide or other form of tungsten in a variety of oxidation states.

17 Claims, 8 Drawing Sheets

(51) Int. Cl.

| | | |
|---|---|---|
| *C01G 41/00* | (2006.01) | |
| *C03C 14/00* | (2006.01) | |
| *C22B 1/00* | (2006.01) | |
| *C22B 34/36* | (2006.01) | |
| *F27B 14/06* | (2006.01) | |
| *F27B 14/10* | (2006.01) | |
| *F27B 14/14* | (2006.01) | |

(52) U.S. Cl.
CPC .............. *F27B 14/061* (2013.01); *F27B 14/10* (2013.01); *F27B 14/14* (2013.01); *C03C 2214/14* (2013.01); *Y02W 30/54* (2015.05)

(56) References Cited

U.S. PATENT DOCUMENTS

| | | | | |
|---|---|---|---|---|
| 2,773,750 | A | * | 12/1956 | Conant ........................ 373/156 |
| 2,905,549 | A | | 9/1959 | Taylor et al. |
| 2,905,550 | A | | 9/1959 | Taylor et al. |
| 3,028,234 | A | | 4/1962 | Alexander et al. |
| 3,112,992 | A | | 12/1963 | Bither, Jr. |
| 3,205,292 | A | | 9/1965 | Descarsin |
| 3,256,058 | A | | 6/1966 | Burwell |
| 3,701,649 | A | | 10/1972 | Svanstrom et al. |
| 3,767,761 | A | | 10/1973 | Svanstrom |
| 4,164,416 | A | * | 8/1979 | Gehri .............................. 75/429 |
| 4,744,821 | A | * | 5/1988 | Yabuki et al. ................... 75/340 |
| 4,902,341 | A | * | 2/1990 | Okudaira et al. ............. 75/10.18 |
| 4,940,486 | A | * | 7/1990 | Sommerville et al. ............ 373/1 |
| 4,996,402 | A | * | 2/1991 | Hashida et al. ................ 219/634 |
| 5,096,689 | A | | 3/1992 | Terry et al. |
| 5,272,720 | A | * | 12/1993 | Cignetti et al. ............... 373/155 |
| 5,882,620 | A | | 3/1999 | Downey et al. |
| 5,939,016 | A | * | 8/1999 | Mathiesen et al. ............... 266/45 |
| 6,049,560 | A | * | 4/2000 | Freeman .......................... 373/7 |
| 6,409,791 | B1 | * | 6/2002 | Petit et al. ..................... 373/142 |
| 6,576,697 | B1 | | 6/2003 | Brown, Jr. |
| 2003/0016723 | A1 | * | 1/2003 | Forbes Jones et al. .......... 373/42 |

FOREIGN PATENT DOCUMENTS

| | | |
|---|---|---|
| GB | 122051 | 1/1919 |
| JP | 2001015319 | 1/2001 |
| JP | 2001110620 | 4/2001 |
| JP | 2001123067 | 5/2001 |
| RU | 2 157 795 C1 | 10/2000 |
| SU | 808370 | 2/1981 |
| SU | 954472 | 8/1982 |
| WO | WO 96/40586 | 12/1996 |

OTHER PUBLICATIONS

Li, K.C. and Wang, Chung Yu, "Tungsten: Its History, Geology, Ore-Dressing, Metallurgy, Chemistry, Analysis, Applications, and Economics," *Reinhold Publishing Corporation* (1947).

Yih, Stephen W.H. and Wang, Chun T., "Tungsten: Sources, Metallurgy, Properties, and Applications," *Plenum Press* (1979).

International Search Report and Written Opinion mailed Aug. 8, 2008.

* cited by examiner

FUSION PROCESS USING AN ALKALI METAL METALATE

CROSS-REFERENCE TO RELATED APPLICATION

This application claims the benefit of U.S. Provisional Patent Application Ser. No. 60/873,735, filed Dec. 8, 2006, which application is hereby incorporated by reference in its entirety.

FIELD OF THE INVENTION

The invention relates to the use of a molten alkali metal metalate phase. The invention further relates to the use of a molten silica glass phase in combination with the metalate phase in a number of specific applications. The invention relates to methods of obtaining an alkali metal metalate that can be processed into a purified metal from a metal source. Metal sources include native ores, recycled metal, metal alloys, impure metal stock, recycle materials, etc. The invention further relates to a method of using a molten alkali metal metalate as a process medium or solvent in purifying or extracting high value metal or metal oxides from metal sources. The invention further relates to processes for vitrification such that the silicate glass phase can be prepared as is or can be prepared with a particulate phase distributed throughout the silica glass phase and encapsulated and fixed within the continuous glass phase.

The invention further relates to methods of obtaining tungsten metal from an alkali metal tungstate, typically finely divided tungsten metal powder from a variety of tungsten sources including recycled tungsten scrap, tungsten carbide scrap, low grade tungsten ore typically comprising tungsten oxide or other form of tungsten in a variety of oxidation states.

BACKGROUND OF THE INVENTION

In the typical prior art process for metal winning, often a first step involves the combination of a caustic reagent such as sodium hydroxide in a high temperature digestion (e.g., autoclave) to solubilize valuable components of a metal source. Such sodium hydroxide processing causes problems related to the difficulty in separating metal species and problems relating to the nature of metal silicate materials produced during the solubilization process.

Since all metals are solubilized in the reaction into a typically sodium metalate form, different metals can be difficult to separate due to the fact that many valuable metals in the transition metal groupings having similar properties are difficult to separate efficiently. Further, the water soluble silicates formed in the processes may form polymeric silica gels, which can substantially inhibit the processability of the solubilized metalate. Additionally, ion exchange columns used in downstream processing can be irreparably harmed by silica that can bind to the resin irreversibly. As a result, sodium hydroxide solubilization processes require substantial intermediate purification to separate valuable metal species from other species in the mixture and to remove silicates from the reaction mixture prior to downstream processing.

Still further, the sodium solubilization metalate processes of the prior art do not lend themselves to winning metal from low grade sources. It is not a commercially viable process to produce tungsten or other transition metals from low grade sources since the concentration of the metal is so low and the resulting by-products from the sodium hydroxide digestion interfere with downstream processing, so that the overall cost of processing does not justify the use of low grade sources.

Downey et al., U.S. Pat. No. 5,882,620, suggest a direct pyrometallurgical process for forming tungsten carbide. While such direct high temperature processes can have some applicability to purification of tungsten, they are difficult to carry out with low grade ore. Further, the process does not work with many metals well enough to realize substantial commercially viable success.

Sodium tungstate is often formed in metal winning processes. However, the use of sodium tungstate or sodium metalates in high temperature fusion chemistry is not known.

In prior art processes for producing sodium tungstate, traditional sources of tungsten, typically tungsten ore, are crushed, milled and sized to a useful size. Often a sulfide float is used to remove copper and bismuth from the raw ore. The crushed ore is separated into a −40 mesh portion that is 70% tungsten oxide which can be further refined. The larger size material is then magnetically separated to remove iron and other ferromagnetic materials leaving a 72% tungsten ore. That ore is then typically combined with a strong base such as NaOH to form a sodium tungstate solution which is then filtered. Silicates are precipitated from solution. The filtrate is solvent extracted with an ammonium reagent to form ammonium paratungstate which is then crystallized and then ultimately reduced with hydrogen. Hydrogen reduction forms tungsten metal by contacting tungsten with hydrogen at high temperature.

While this traditional process produces tungsten metal, a significant problem exists at the stage where the tungsten oxide intermediate product is contacted with a strong base. That strong base tends to dissolve all of the metal containing input material leaving a sodium tungstate solution containing a variety of calcium, magnesium and other impurities that are brought forward in the process sequence. While silicates and some other materials are precipitated, the material remains somewhat impure.

A substantial need exists to obtain a tungsten purification system that obtains a substantially purified sodium tungstate that can be further processed into tungsten metal. Further, substantial need exists in learning to use molten sodium metalate phases as solvents or processable liquid materials. Finally, a substantial need exists in using fusion processes to form vitreous structures wherein particulate material, such as radioactive waste products, can be encapsulated and held within the vitreous structure.

BRIEF DISCUSSION OF THE INVENTION

The process of the invention for refining a source of metal into a useful metal uses an aqueous metalate salt and a process for converting the impure metalate salt into a relatively pure metalate. The process involves combining a source of metal with an alkali metal salt and a source of silicon dioxide to form a mixture. The mixture is heated to a temperature to allow microcorrosion with the tungsten species by the alkali metal salt to form a melt flux. The components of the flux microcorrode, and as it reacts within the flux, the alkali metal salt reacts with metal sources in the melt to form an alkali metal metalate in the melt flux. As this reaction proceeds, the alkali metal metalate product phases out of the reaction mixture creating a soda glass fraction and a heavier metalate fraction. The separated alkali metal metalate phase is substantially purified metalate salt. The novel process of the invention involves a high temperature melt/flux separation step that results in the formation of a highly purified metalate salt substantially free of calcium, with an increased oxidation state and as the reaction proceeds a phase separation occurs. The sodium metalate precipitates from the flux into a metalate phase leaving a separated flux phase containing a silica glass. Such a glass phase includes the large majority of impurities that can be separated in a heated state or liberated by crushing the mixture and then be dissolved in water to an appropriate concentration and further processed for purification into metal.

The process of the invention employs, as a second aspect of the invention, a unique reactor system that is adapted to an input of a metal source, an alkali metal salt and silica. The reactor is shaped and configured to accept the charge, heat the charge to a temperature that can form a molten glass phase and a molten alkali metalate phase within the conductive or non-conductive reactor vessel. The density and viscosity of the molten phases are controlled by reactor dimensions, power input, temperature and mix ratios. As such, the reactor can act as a substantially continuous reactor. As additional charge is added to the top of the reactor, the charge is driven by gravity through the intake portion of the reactor into a reaction zone wherein the reactor heating causes the charge to react and form a silicate glass phase and a sodium metalate phase. The density of the molten phases causes the phases to be directed to the base of the reactor where the phases can either be separated and removed from the reactor or removed from the reactor simultaneously for further processing.

The reactor is an inductively heated conductive container with an inductive reactor core. We have found that the power output from an induction solenoid directed to the conductive container and core can be matched to the geometry of the core and container such that the power is converted to heat which can form the fused glass and molten metalate phases in the reactor space. The induction coil or solenoid cooperates with the non-conductive or conductive container and a conductive reactor core to create conditions such that the particulate input can be heated, fused, reacted and converted to a useful by-product, and then withdrawn through the bottom of the reactor vessel. The reactor core is shaped and configured such that it optimizes the heating of the charge, the heat causing the positive reaction to occur and then providing a path such that the molten or fused liquid can flow through the core structure to an exit from the conductive vessel. The input power, the internal volume of the reactor vessel, the configuration of the reactor core, all cooperate in combination with the input charge to rapidly heat and fuse, thereby promoting a rapid reaction to form the product alkali metal metalate.

The material of construction for the shell and core of the reactor is chosen to provide maximum electrical heating efficiency by induction, good thermal durability, and resistance to chemical attack from the flux and the product. The shape of the reactor core with respect to the reactor shell is driven by the chemical and physical response of the reaction mixture to temperature and power draw. The starting material, usually a powder blend with moderate bulk density, reacts upon heating, increasing in density, and corroding nearby components, which in turn increases the density, enhances corrosion and thereby reaction rate.

Flow of material through the reactor is optimized by shaping the reactor core to match the rate of reaction. As the materials melt and react, the density of the reaction mixture increases, air is excluded, and byproduct gases are released. By matching the cross-sectional area of the reactor core to the density of the reaction mixture at each point in time, maximum heat and power transfer is achieved. To maintain temperature, power draw is adjusted by changing the wall thickness of the reactor core and the lateral position within the induction coil. The length of time the materials stay at the target temperature is controlled by adjusting the path for material flow, resulting in a change in hold up volume.

Heating occurs in the reactor core and shell through eddy current losses. The magnetic field around the current carrying core and shell results in a temperature rise based on the resistance of the material of construction, the frequency of the applied magnetic field, the cross-sectional area of the susceptor, and the location in the coil. If the reactor shell is conductive then there is a limitation of the heating of the reactor to the wall and if the wall is too large compared to its reference depth, there will not be a strong enough field inside to power the core. In general the reactor shell wall must be less than about 10% of the outside diameter to provide enough field to power the core.

The process for refining an ore source into tungsten metal uses an aqueous tungstate salt. The process for converting an impure tungstate salt into a relatively pure alkali metal or sodium tungstate involves combining a tungsten source with an alkali metal or sodium salt and a source of silicon dioxide to form a mixture. The mixture is heated to a temperature forming a melt flux. Within the flux, the alkali metal or sodium source reacts with the tungsten in the tungsten source forming heavy alkali metal or sodium tungstate in the melt flux. As the reaction produces an alkali metal or sodium tungstate, a phase change occurs such that the sodium tungstate phase separates from the flux phase. The heavy sodium tungstate phase is substantially pure sodium tungstate. The lighter soda glass phase floats on the heavy tungstate. The flux phase contains a silicate glass and the major proportion of impurities separated from the tungsten source.

These phases can be separated and the metalate phase is dissolved in water for further purification. The improved melt flux process converts tungsten to sodium tungstate that can be easily dissolved into water to form a processable sodium tungstate solution for further purification. The silicate glass phase is insoluble and after phase separation includes the vast majority of impurities including calcium, iron, sulfur, manganese, cobalt and other such compounds. The recovery of tungsten as measured by the amount of tungsten added to the flux compared to the amount of tungsten recovered from the flux exceeds 90% recovery. The purity of tungsten as sodium tungstate in solution is substantially greater than 90% and approaches 99% pure.

The tungsten metal of the invention can be formed in a small particle form having a particle size that ranges from about 1 micron and higher to facilitate the microcorrosion reaction. Typically, the particle size of the material can be from about 10 microns to about 300 microns, can be about 50 microns to about 500 microns or can be about 70 microns to 500 microns or higher. The metal particulates of the invention are particularly suitable for forming a metal polymer composite using metals of high density. The metal particulates, particularly bismuth, tungsten and other high density metals are particularly useful for forming very high density metal polymer composite materials by blending an appropriate selection of metal particle sizes with appropriate amounts of polymers under the right conditions to obtain close packing and high composite densities. A fast productive method for forming a highly pure metal particulate is particularly useful in an overall process for forming the metal polymer composites. Overall, the process begins with a source tungsten ore and ends with a fully compounded metal polymer composite material. In the process, the tungsten ore is purified to a substantially pure sodium tungstate, the sodium tungstate is converted into a tungstate anion absorbed onto an ion exchange resin which can be eluded from the resin under appropriate conditions to form an ammonium or amine tungstate salt, preferably ammonium paratungstate which can be crystallized into a crystal form. The crystallized ammonium paratungstate is then calcined to a tungsten oxide, which can be directly reduced in a hydrogen furnace to tungsten particulate. The tungsten particulate, under appropriate conditions, can be combined and compounded with an appropriate polymer to form the compounded composite which is then pelletized or formed into a final product.

For the purpose of this invention, the term "source of metal" includes a source of a metal from the Groups IVB, VB, VIB, VIIB, VIII, IVA and VA. In the reaction between the alkali metal salt and the source of metal in the melt flux, the metal needs to react in the melt flux to form a metalate salt.

The term "source of metal" includes metal or metal scrap, metal alloy, tailings from the manufacture or processing of metal ores or high grade ores. The term "source of metal" can include virtually any metal containing composition that can react with the alkali metal salt at melt flux temperatures. The term "source of tungsten" includes any tungsten containing composition that will react with an alkali metal or sodium salt at flux temperatures to form the alkali metal or sodium tungstate product in the melt reaction.

The term "source of tungsten" includes tungsten scrap, tungsten carbide that can be scrap, recycle or synthetic tungsten carbide, tailings from the manufacture of high grade sodium tungstate or can include sodium tungstate native ore. High grade ore from natural sources typically contains 30-72% tungsten on a tungsten oxide basis. Substantially complete tungsten recoveries from such ores are possible. Tungsten source characterizes hard scrap, typically comprising 80-95 wt % as tungsten oxide can also be used beneficially. Relatively low grade tungsten ores, typically not usable in traditional processing can be used. These ores typically contain 10-40 wt % as tungsten oxide.

The term "alkali metal salt" typically refers to alkali metals in Group IA of the Periodic Chart. Alkali metals typically include lithium, sodium and potassium salts that can be used in the flux reaction of the invention. Preferred salts in this regard include lithium oxide, sodium oxide, potassium oxide, lithium carbonate, sodium carbonate or potassium carbonate. Typically, any basic alkali metal salt of these metals can be used such that the salt will form an effective amount of the alkali metal oxide in the flux to react with the source of metal to form the alkali metal metalate salt for that in the melt initiates the phase separation. In the context of this invention, an alkali metal does not include any of the metals that can be purified to form the product of the invention.

The term "alkali metal metalate" typically refers to alkali metal salts (typically lithium, sodium, potassium salts) of metalate anions. Typically, the metalate anion is made from Group IIIB, IVB, VB, VIB, VIIB, VIII, 1B metals. Preferably, the metals include yttrium, zirconium, niobium, molybdenum, technetium, ruthenium, rhodium, platinum, palladium, silver, gold, iridium, osmium, rhenium, tungsten, tantalum, hafnium, lanthanum and mixtures thereof.

BRIEF DESCRIPTION OF THE FIGURES

FIG. 2 shows a high grade tungsten oxide tungsten source, while FIG. 3 shows a low grade tungsten source with 31.6% tungsten.

DETAILED DISCUSSION OF THE INVENTION

Figure 1:
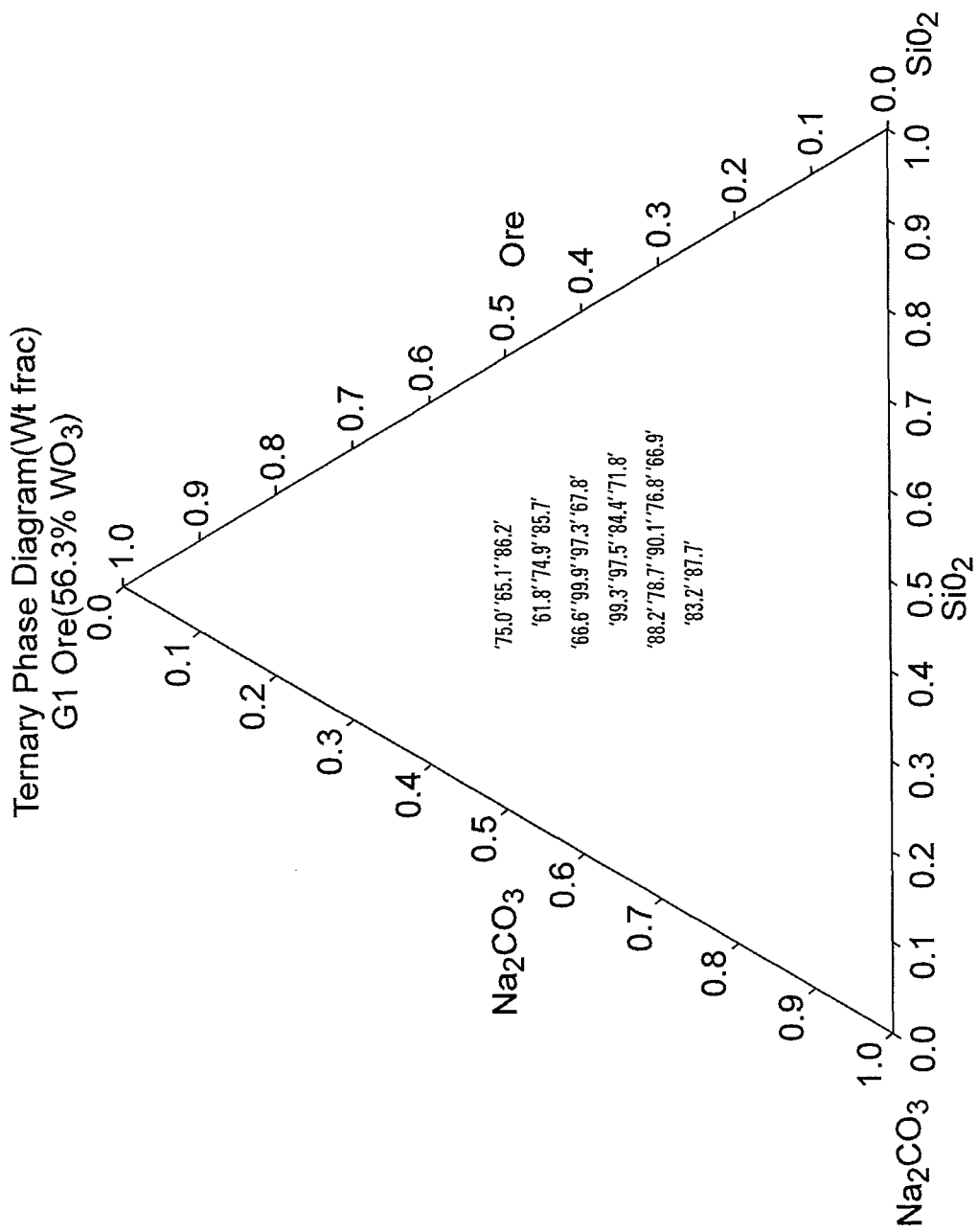
FIGS. 1-3 are ternary diagrams showing the optimal ratios of sodium carbonate, silica and tungsten source when using a medium grade tungsten ore.

The process of the invention involves selecting a source of a metal, combining the source of metal with an alkali metal salt in silicon dioxide to form a mixture, heating the mixture to form a melt flux. At the melt temperature, the alkali metal salt reacts with the source of metal to form an alkali metal metalate, which in turn causes a phase separation into a soda glass fraction and a sodium metalate fraction. At this temperature, the soda glass fraction floats on the heavier metalate fraction permitting ease of separation or processed as a mixture which the metalate is liberated by crushing. The sodium metalate fraction is highly pure and can be readily processed to give the pure metal in a variety of metal forms.

One important value of the process of the invention is the removal of virtually all soluble sulfur leaving little detectable soluble sulfur in the final purified metal product. From low grade ores, metal recoveries can be achieved up to 96-98 wt %. Another advantage of the refining process of this invention involves the ability to mix a variety of metal sources. Hard scrap, carbides, oxide tailings, and high grade ore can be used in varying proportions without substantial detriment and can all be processed, adding to the utility of the method.

The melt flux process of the invention can convert all available metal from the metal source or mixtures of metal sources into a soluble metal salt which can then be directed to an ion exchange resin for further purification.

The process by which the impurities in the native metal ore are removed, leaving the purified alkali metal metalate, involves combining a source of silica and an alkali metal salt, typically sodium or potassium carbonate or sodium or potassium oxide with a tungsten oxide source. When heated, this mixture forms a melt flux. As the alkali salt decomposes into an alkali metal oxide, typically sodium oxide ($Na_2O$), potassium oxide ($K_2O$) or lithium oxide ($Li_2O$), it becomes molten. The molten phase including the alkali metal oxide reactant reacts with or "corrodes" the source metal in the mixture including high grade or low grade ore, carbide, or other recycle materials. Virtually all the metal in the melt flux is converted to a metalate salt $(MO_n)^{-2}$ while the excess alkali metal oxide combines with silicon dioxide to create a soda glass. This soda glass (can be considered a slag) contains virtually all oxides and other impurities from the source of metal and impurities formed in the melt process. Impurities remain within the soda glass as the pure metalate separates into a phase that is more dense than the glass and separates by gravity from the glass slag to form a lower fraction or liberated in a crushing phase.

Depending on the source of metal used, the process can use different ratios of silica, alkali metal salt and source of metal. The data shown below explore the usable and preferred ratios of materials to form the melt flux leading to metalate separation.

In the overall process utilizing tungsten, a tungsten ore selected from scheelite or wolframite is combined with a flux forming blend that such that the combination reacts and then separates or microseparates under conditions of high temperature into a slag phase and a high density alkali metal or sodium tungstate phase. In one embodiment of the invention, the slag forming materials comprise about 10 to 55 wt % of an alkali metal salt, such as sodium carbonate, and about 30 to 50 wt % of silica. About 15 to 65 wt % tungsten ore is added to these slag forming materials. The material is then comminuted and processed to form a particulate blend having a particle size of typically about 10-500 mesh or less, typically 200 mesh. The particulate material is then heated in a furnace ($O_2$ atmosphere) to a temperature greater than about 1050° C. At this temperature, the flux material becomes molten and impurities from the ore become dissolved or suspended into the flux.

Over a period of time that can range from about 3 to 600 minutes, the molten material separates into a low density upper phase and a high density lower phase. The high density lower phase comprises alkali tungstate, such as sodium tungstate, of substantial purity. The substantial majority of any impurities, most typically calcium oxide, magnesium salts, boron compounds, aluminum compounds, silicon compounds and other trace metals in the ore are dissolved in the flux forming compounds and remain in the low density upper phase after phase separation is complete.

The molten mass can be visually inspected to ensure full phase separation and the slag portion can be removed from the top or the sodium tungstate can be removed from the bottom. Preferably, the slag is removed from the top by eluting the liquid leaving the high density sodium tungstate phase in the bottom of the process equipment. This process can be conducted either in a batchwise or continuous fashion, relying on the high density sodium tungstate phase to readily separate from the slag forming components of the flux material. This can also be done continuously and liberated in a crushing phase to allow dissolution of the metalate into the aqueous phase.

After the material is cooled to a temperature less than about 675° C., the purified sodium tungstate can then be placed in a ball mill or other comminuting structure to reduce the particle size of the sodium tungstate to less than about 1 mm (less than or equal to 200 mesh). Once the particle size is reduced to a size effective for dissolution, the sodium tungstate is then dissolved in deionized water, the percentage based on the mass of sodium tungstate in the dissolution step. Once the sodium tungstate is fully dissolved, sodium tungstate is filtered and the particulate is removed, leaving a concentrated solution of sodium tungstate typically comprising about 10 to about 500 grams of sodium tungstate per liter of solution.

The filtered sodium tungstate solution can then be applied to an ion exchange resin. Preferably, the ion exchange resin is an anion resin with a strong anion such as chloride anion. The resin binds with the tungstate anion displacing the chloride anion from the resin, thus extracting tungsten from the concentrated aqueous solution. A preferable anion exchange resin comprises Rohm & Haas IRA 4400Cl resin with a chloride anion species. Once the anion exchange resin is loaded with tungstate, the tungstate is eluted from the resin using an aqueous ammonium hydroxide, ammonium chloride solution at a concentration of about 1 normal. The chloride ion being in excess displaces the tungsten oxide and regenerates the ion exchange column. The ammonium cation elutes as the tungstate counterion yielding ammonium paratungstate. The ammonium paratungstate is crystallized and then placed in a reducing atmosphere at a temperature of about 300° to about 1000° C. to convert the ammonium paratungstate to tungsten blue oxide while the ammonia can be recovered. The tungsten blue oxide is then placed in a hydrogen reduction furnace to convert the tungsten oxide to tungsten particulate. Typically, the atmosphere comprises about 10 to 30% hydrogen, the balance being nitrogen or other inert gases.

After reduction and sizing, the preferred tungsten metal particulate may be combined with a polymer to form a polymer composite as describe above. Polymers or other agents may be added to the tungsten metal at about 0.01 to about 5 wt % of polymer based on the weight of the modified particulate metal. One value of the overall process is the substantial separation of alkali metal ions from the tungsten during the process. The concentration of the alkali metal ions arising in the initial phase separation is reduced from about 70 grams per liters to less than about 27 milligrams per liter in the aqueous solution prior to ion exchange. Prior the ion exchange step, the raw aqueous alkali metal tungstate solution contains a variety of anions including $WO_4^{-2}$, $MoO_4^{-2}$, $HSO_4^{-1}$, $HPO_4^{-2}$, $SiO^{-1}$ and $OH^{-1}$. By using a strong basic ion exchange resin, these anions can be separated from the tungsten material which is eluted and substantially purified. Prior to contact with a column, the alkali metal tungstate solution must be adjusted to an optimal concentration that ranges from about 10 to 50 grams of sodium tungstate per liter of aqueous solution. As the concentration of alkali metal tungstate increases, the binding capacity of the resin is substantially reduced.

In the crystallization step, solution from the ion exchange step is evaporated, the ammonia and water are volatilized forming ammonium paratungstate $NH_4[(H_2W_{12}O_{42}]_{10}$, a low solubility salt. This salt readily crystallizes substantially increasing the purity. Upon heating the ammonium paratungstate crystal to calcining temperatures, ammonia and water are driven from the salt resulting in the formation of tungsten oxide, typically the blue tungsten oxide crystal form.

An experiment was conducted to determine the utility of the invention in converting a variety of metal sources to metal showing that the process can be used with high grade or low grade ore and alloy components. In the conduct of the experiment, the metal source, sodium carbonate and silicon dioxide were mixed in a mixing cup in the amounts shown in the following tables. The formulation was mixed and charged to a Coors crucible of an appropriate size. The crucible was heated in the muffle furnace from ambient at a heating rate of 10° C. per minute until reaching a maximum temperature of 1200° C. The crucibles were maintained at that temperature for at least 180 minutes. The crucibles were removed from the muffle furnace after the termination of the heating period and cooled. The crucibles were broken apart, the separated silica glass phase was removed and the precipitated metalate fraction was placed into appropriately sized glass beakers with deionized water for dissolution of the sodium metalate. Once fully dissolved, the metalate solutions were filtered using a vacuum pump and then diluted to a constant volume of 250 milliliters. The aqueous samples were analyzed for soluble metalate or tungstate salt using an Asoma XRF Elemental Analyzer (from the Asoma Instruments Company of Austin, Tex.). The following tables show that the results of the experiments using a source of tungsten comprising a combination of a 56.3 wt % $WO_3$ source, an 86.6 wt % $WO_3$ source, and a 31 wt % $WO_3$ source. In all cases, the metal source provides substantial recoveries of tungsten from the flux process.

G1 Concentrate Experiments (56.3% WO$_3$)

| Sample | Wt Frac Na$_2$CO$_3$ | Wt Frac Ore | Wt Frac SiO$_2$ | Mass (g) Na$_2$CO$_3$ | Mass (g) Ore | Mass (g) SiO$_2$ | Concen. WO$_4$ (g/L) | Recovered WO$_4$ (g) | Theoretical WO$_4$ (g) | Tungsten Recovery % |
|---|---|---|---|---|---|---|---|---|---|---|
| A1 | 30.00 | 30.00 | 40.00 | 10.50 | 10.50 | 14.00 | 21.68 | 5.42 | 6.02 | 90.1 |
| A2 | 25.00 | 30.00 | 45.00 | 8.75 | 10.50 | 15.75 | 18.50 | 4.62 | 6.02 | 76.9 |
| A3 | 20.00 | 30.00 | 50.00 | 7.00 | 10.50 | 17.50 | 16.10 | 4.03 | 6.02 | 66.9 |
| A4 | 30.00 | 35.00 | 35.00 | 10.50 | 12.25 | 12.25 | 27.38 | 6.85 | 7.02 | 97.5 |
| A5 | 25.00 | 35.00 | 40.00 | 8.75 | 12.25 | 14.00 | 23.69 | 5.92 | 7.02 | 84.4 |
| A6 | 20.00 | 35.00 | 45.00 | 7.00 | 12.25 | 15.75 | 20.16 | 5.04 | 7.02 | 71.8 |
| B1 | 30.00 | 40.00 | 30.00 | 10.50 | 14.00 | 10.50 | 32.05 | 8.01 | 8.02 | 99.9 |
| B2 | 25.00 | 40.00 | 35.00 | 8.75 | 14.00 | 12.25 | 31.22 | 7.81 | 8.02 | 97.3 |
| B3 | 20.00 | 40.00 | 40.00 | 7.00 | 14.00 | 14.00 | 21.75 | 5.44 | 8.02 | 67.8 |
| B4 | 30.00 | 45.00 | 25.00 | 10.50 | 15.75 | 8.75 | 22.31 | 5.58 | 9.02 | 61.8 |
| B5 | 25.00 | 45.00 | 30.00 | 8.75 | 15.75 | 10.50 | 27.06 | 6.77 | 9.02 | 75.0 |
| B6 | 20.00 | 45.00 | 35.00 | 7.00 | 15.75 | 12.25 | 31.28 | 7.82 | 9.02 | 86.7 |
| C1 | 30.00 | 50.00 | 20.00 | 10.50 | 17.50 | 7.00 | 30.10 | 7.52 | 10.03 | 75.0 |
| C2 | 25.00 | 50.00 | 25.00 | 8.75 | 17.50 | 8.75 | 26.13 | 6.53 | 10.03 | 65.1 |
| C3 | 20.00 | 50.00 | 30.00 | 7.00 | 17.50 | 10.50 | 34.59 | 8.65 | 10.03 | 86.2 |
| C4 | 35.00 | 30.00 | 35.00 | 12.25 | 10.50 | 12.25 | 18.94 | 4.74 | 6.02 | 78.7 |
| C5 | 35.00 | 35.00 | 30.00 | 12.25 | 12.25 | 10.50 | 27.88 | 6.97 | 7.02 | 99.3 |
| C6 | 35.00 | 40.00 | 25.00 | 12.25 | 14.00 | 8.75 | 21.04 | 5.26 | 8.02 | 65.6 |
| D1 | 40.00 | 35.00 | 25.00 | 14.00 | 12.25 | 8.75 | Lost | Lost | 7.02 | Lost |
| D2 | 40.00 | 30.00 | 30.00 | 14.00 | 10.50 | 10.50 | 21.23 | 5.31 | 6.02 | 88.2 |
| D3 | 40.00 | 25.00 | 35.00 | 14.00 | 8.75 | 12.25 | 16.69 | 4.17 | 5.01 | 83.2 |
| D4 | 35.00 | 25.00 | 40.00 | 12.25 | 8.75 | 14.00 | 17.59 | 4.40 | 5.01 | 87.7 |

Calcined Tungsten Carbide Experiments (86% WO$_3$) Samples Diluted to 500 mL

| Sample | Wt Frac Na$_2$CO$_3$ | Wt Frac Ore | Wt Frac SiO$_2$ | Mass (g) Na$_2$CO$_3$ | Mass (g) Ore | Mass (g) SiO$_2$ | Concen. WO$_4$ (g/L) | Recovered WO$_4$ (g) | Theoretical WO$_4$ (g) | Tungsten Recovery % |
|---|---|---|---|---|---|---|---|---|---|---|
| 1 | 40.00 | 35.00 | 25.00 | 14.00 | 12.25 | 8.75 | 20.92 | 10.46 | 11.34 | 92.2 |
| 2 | 35.00 | 35.00 | 30.00 | 12.25 | 12.25 | 10.50 | 22.52 | 11.26 | 11.34 | 99.3 |
| 3 | 30.00 | 35.00 | 35.00 | 10.50 | 12.25 | 12.25 | 22.47 | 11.24 | 11.34 | 99.1 |
| 4 | 40.00 | 40.00 | 20.00 | 14.00 | 14.00 | 7.00 | 24.03 | 12.02 | 12.96 | 92.7 |
| 5 | 35.00 | 40.00 | 25.00 | 12.25 | 14.00 | 8.75 | 25.76 | 12.88 | 12.96 | 99.4 |
| 6 | 30.00 | 40.00 | 30.00 | 10.50 | 14.00 | 10.50 | 25.54 | 12.77 | 12.96 | 98.5 |

Concentrate Experiments (31.6% WO$_3$)

| Sample | Wt Frac Na$_2$CO$_3$ | Wt Frac Ore | Wt Frac SiO$_2$ | Mass (g) Na$_2$CO$_3$ | Mass (g) Ore | Mass (g) SiO$_2$ | Concen. WO$_4$ (g/L) | Recovered WO$_4$ (g) | Theoretical WO$_4$ (g) | Tungsten Recovery % |
|---|---|---|---|---|---|---|---|---|---|---|
| A1 | 25.00 | 35.00 | 40.00 | 8.75 | 12.25 | 14.00 | 9.56 | 2.39 | 4.14 | 57.8 |
| A2 | 20.00 | 35.00 | 45.00 | 7.00 | 12.25 | 15.75 | 5.64 | 1.41 | 4.14 | 34.1 |
| A3 | 15.00 | 35.00 | 50.00 | 5.25 | 12.25 | 17.50 | 3.17 | 0.79 | 4.14 | 19.2 |
| A4 | 25.00 | 40.00 | 35.00 | 8.75 | 14.00 | 12.25 | 10.63 | 2.66 | 4.73 | 56.2 |
| A5 | 20.00 | 40.00 | 40.00 | 7.00 | 14.00 | 14.00 | 4.68 | 1.17 | 4.73 | 24.7 |
| A6 | 15.00 | 40.00 | 45.00 | 5.25 | 14.00 | 15.75 | 3.10 | 0.78 | 4.73 | 16.4 |
| B1 | 40.00 | 30.00 | 30.00 | 14.00 | 10.50 | 10.50 | 11.30 | 2.83 | 3.55 | 79.6 |
| B2 | 35.00 | 30.00 | 35.00 | 12.25 | 10.50 | 12.25 | 11.43 | 2.86 | 3.55 | 80.6 |
| B3 | 30.00 | 30.00 | 40.00 | 10.50 | 10.50 | 14.00 | 10.29 | 2.57 | 3.55 | 72.5 |
| B4 | 40.00 | 25.00 | 35.00 | 14.00 | 8.75 | 12.25 | 9.14 | 2.29 | 2.96 | 77.3 |
| B5 | 35.00 | 25.00 | 40.00 | 12.25 | 8.75 | 14.00 | 9.08 | 2.27 | 2.96 | 76.8 |
| B6 | 30.00 | 25.00 | 45.00 | 10.50 | 8.75 | 15.75 | 8.48 | 2.12 | 2.96 | 71.7 |
| C1 | 45.00 | 20.00 | 35.00 | 15.75 | 7.00 | 12.25 | 5.49 | 1.37 | 2.36 | 58.0 |
| C2 | 40.00 | 20.00 | 40.00 | 14.00 | 7.00 | 14.00 | 6.59 | 1.65 | 2.36 | 69.7 |
| C3 | 35.00 | 20.00 | 45.00 | 12.25 | 7.00 | 15.75 | 7.31 | 1.83 | 2.36 | 77.3 |
| C4 | 50.00 | 15.00 | 35.00 | 17.50 | 5.25 | 12.25 | 1.02 | 0.26 | 1.77 | 14.4 |
| C5 | 45.00 | 15.00 | 40.00 | 15.75 | 5.25 | 14.00 | 2.85 | 0.81 | 1.77 | 40.2 |
| C6 | 40.00 | 15.00 | 45.00 | 14.00 | 5.25 | 15.75 | 4.62 | 1.16 | 1.77 | 65.1 |
| D1 | 35.00 | 35.00 | 30.00 | 12.25 | 12.25 | 10.50 | 13.56 | 3.39 | 4.14 | 81.9 |
| D2 | 30.00 | 35.00 | 35.00 | 10.50 | 12.25 | 12.25 | 10.41 | 2.60 | 4.14 | 62.9 |
| D3 | 35.00 | 40.00 | 25.00 | 12.25 | 14.00 | 8.75 | 16.26 | 4.07 | 4.73 | 86.0 |
| D4 | 30.00 | 40.00 | 30.00 | 10.50 | 14.00 | 10.50 | 12.54 | 3.14 | 4.73 | 66.3 |
| D5 | 35.00 | 45.00 | 20.00 | 12.25 | 15.75 | 7.00 | 18.66 | 4.67 | 5.32 | 87.7 |

-continued

| | Concentrate Experiments (31.6% WO₃) | | | | | | | | |
|---|---|---|---|---|---|---|---|---|---|
| | Wt Frac | | | Mass (g) | | | Concen. WO₄ | Recovered WO₄ | Theoretical | Tungsten Recovery |
| Sample | Na₂CO₃ | Ore | SiO₂ | Na₂CO₃ | Ore | SiO₂ | (g/L) | (g) | WO₄ (g) | % |
| D6 | 40.00 | 40.00 | 20.00 | 14.00 | 14.00 | 7.00 | 16.86 | 4.22 | 4.73 | 89.1 |
| E1 | 45.00 | 25.00 | 30.00 | 15.75 | 8.75 | 10.50 | 7.02 | 1.76 | 2.96 | 59.4 |
| E2 | 50.00 | 25.00 | 25.00 | 17.50 | 8.75 | 8.75 | 7.78 | 1.95 | 2.96 | 65.8 |
| E3 | 45.00 | 30.00 | 25.00 | 15.75 | 10.50 | 8.75 | 10.48 | 2.62 | 3.55 | 73.9 |
| E4 | 50.00 | 30.00 | 20.00 | 17.50 | 10.50 | 7.00 | 10.19 | 2.55 | 3.55 | 71.8 |
| E5 | 40.00 | 35.00 | 25.00 | 14.00 | 12.25 | 8.75 | 13.9 | 3.50 | 4.14 | 84.5 |
| E6 | 45.00 | 35.00 | 20.00 | 15.75 | 12.25 | 7.00 | Lost | Lost | 4.14 | Lost |
| F1 | 45.00 | 40.00 | 15.00 | 15.75 | 14.00 | 5.25 | 17.81 | 4.45 | 4.73 | 94.1 |
| F2 | 50.00 | 40.00 | 10.00 | 17.50 | 14.00 | 3.50 | 15.31 | 3.83 | 4.73 | 80.9 |
| F3 | 40.00 | 45.00 | 15.00 | 14.00 | 15.75 | 5.25 | 20.73 | 5.18 | 5.32 | 97.4 |
| F4 | 45.00 | 45.00 | 10.00 | 15.75 | 15.75 | 3.50 | 16.93 | 4.23 | 5.32 | 79.6 |
| F5 | 35.00 | 50.00 | 15.00 | 12.25 | 17.50 | 5.25 | 21.37 | 5.34 | 5.91 | 90.4 |
| F6 | 40.00 | 50.00 | 10.00 | 14.00 | 17.50 | 3.50 | 16.87 | 4.22 | 5.91 | 71.3 |

The following experiment reproduces the method used to obtain the data from the previous tables. However, in this experiment, a mixture of tungsten carbide and tungsten oxide WO₃ were obtained and combined with sodium carbonate and silicon dioxide in the flux process described above. The mixing of tungsten oxide sources with other metal sources can provide flexibility in costs and raw material supplies for producing the tungsten metal. This experiment shows that different sources of tungsten can be mixed in the same mixture for melt processing and the resulting process will result in a high quality product and the silica glass fraction would be able to accommodate the impurities from any tungsten source or combinations of sources.

| | Sample # | | |
|---|---|---|---|
| | D | D | D |
| Wt % | | | |
| Ore (53.6% WO₃) | 40.00 | 20.00 | |
| Calcined WC (86.3% WO₃) | — | 25.00 | 50.00 |
| Na₂CO₃ | 30.00 | 30.25 | 30.50 |
| SiO₂ | 30.00 | 24.75 | 19.50 |
| Mass (g) | | | |
| Ore (53.6% WO₃) | 40.00 | 20.00 | |
| Calcined WC (86.3% WO₃) | — | 25.00 | 50.00 |
| Na₂CO₃ | 30.00 | 30.25 | 30.50 |
| SiO₂ | 30.00 | 24.75 | 19.50 |
| Theoretical WO₄(g) | 31.22 g | 38.59 g | 45.97 g |
| XRF Analysis (g/L WO₄) 500 mL | 61.82 g/L | 74.7 g/L | 87.27 g/L |
| Tungsten Recovery (%) | 99.01% | 96.79% | 94.93% |

Mixing two high-recovery formulations of each independent WO₃ source produced a hybrid charge with a high recovery, resembling an average of the two formulations.

DETAILED DISCUSSION OF THE DRAWINGS

FIG. 1 shows a ternary phase diagram that analyzes the recovery of sodium tungstate as a function of the amount of ore, sodium carbonate and silicon dioxide placed in the melt reaction system. Maximum recoveries are shown in the center of the ternary phase diagram. In the data of Phase 1, the source of metal is a native ore containing 56.3 wt % tungsten oxide. Recoveries in an amount of 60% or higher can be commercially useful, however, the phase diagram shows that virtually complete recoveries from this grade ore is possible. A recovery of 99.9% of tungsten as sodium tungstate was achieved.

Figure 2:
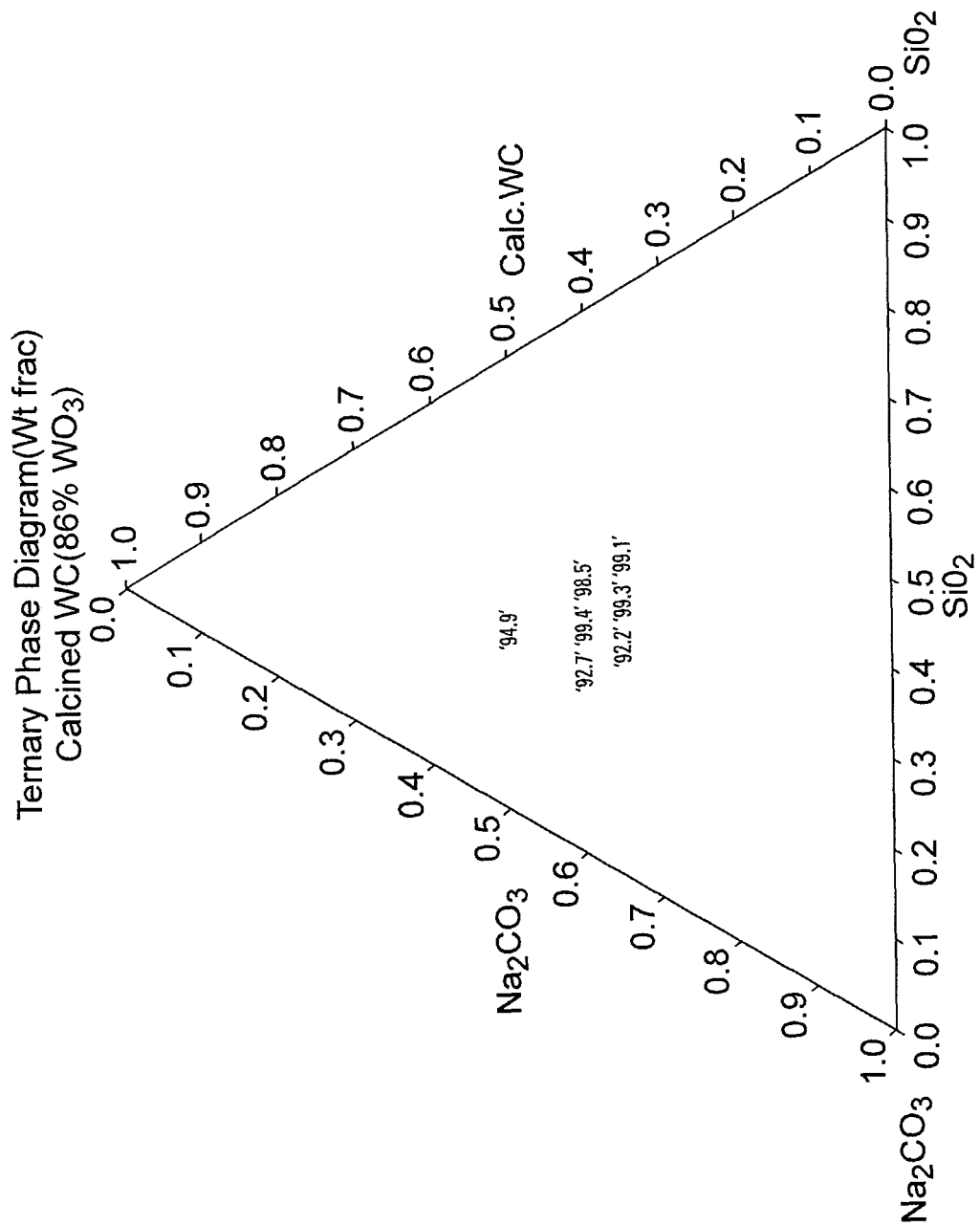

FIG. 2 shows a ternary phase diagram that analyzes the recovery of sodium tungstate as a function of the amount of calcined tungsten carbide, sodium carbonate and silicon dioxide placed in the melt reaction system. Maximum recoveries are shown in the center of the ternary phase diagram. In the data of Phase 1, the source of metal is a calcined tungsten carbide containing 86 wt % tungsten oxide. Recoveries in an amount of 60% or higher can be commercially useful. However, the phase diagram shows that virtually complete recoveries from this grade ore is possible. A recovery of 99.4% of tungsten as sodium tungstate was achieved.

Figure 3:
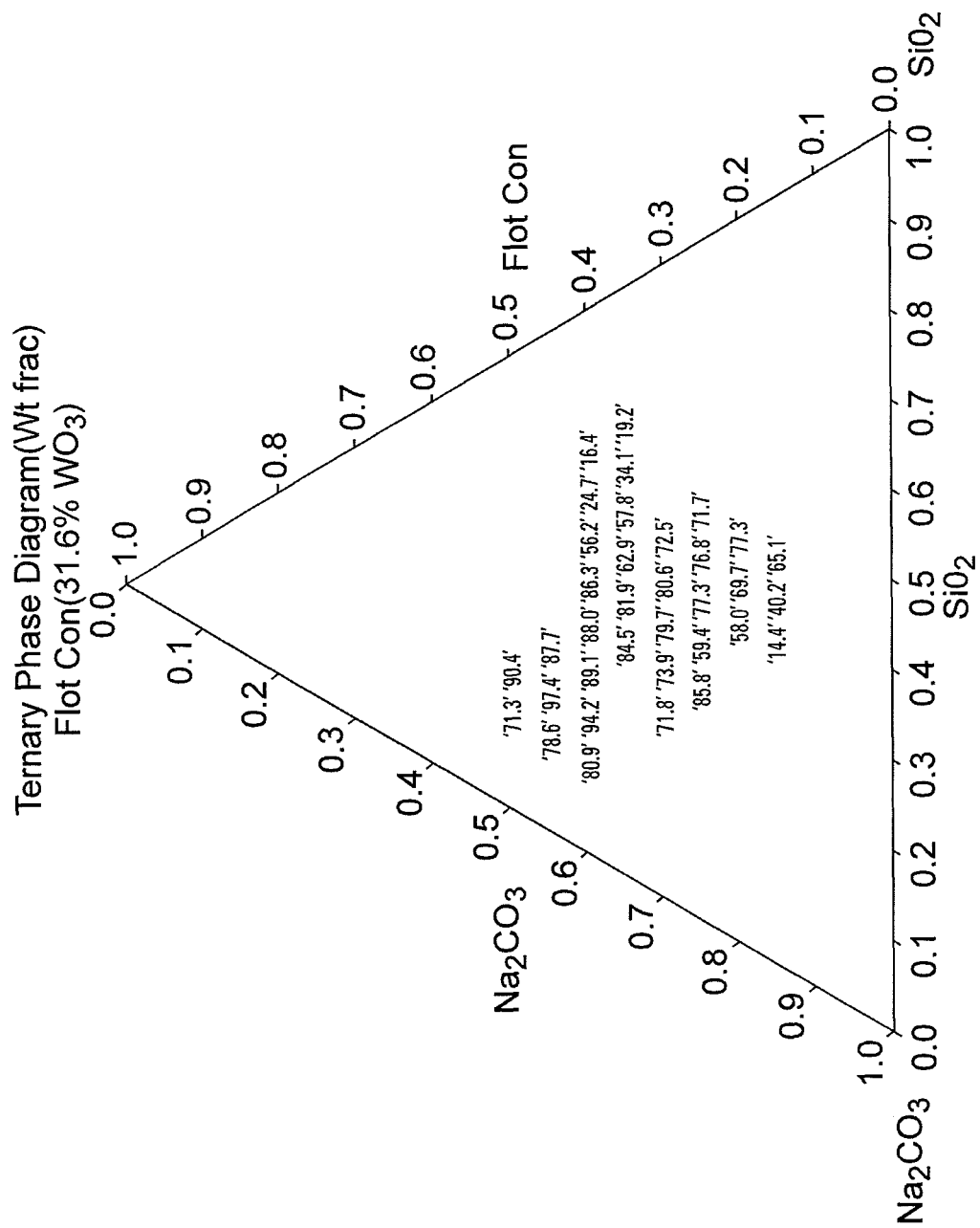

FIG. 3 shows a ternary phase diagram that analyzes the recovery of sodium tungstate as a function of the amount of ore, sodium carbonate and silicon dioxide placed in the melt reaction system. Maximum recoveries are shown in the center of the ternary phase diagram. In the data of Phase 1, the source of metal is a native ore containing 31.6 wt % tungsten oxide. Recoveries in an amount of 60% or higher can be commercially useful, however, the phase diagram shows that virtually complete recoveries from this grade ore is possible. A recovery of 97.4% of tungsten as sodium tungstate was achieved.

Figure 4:
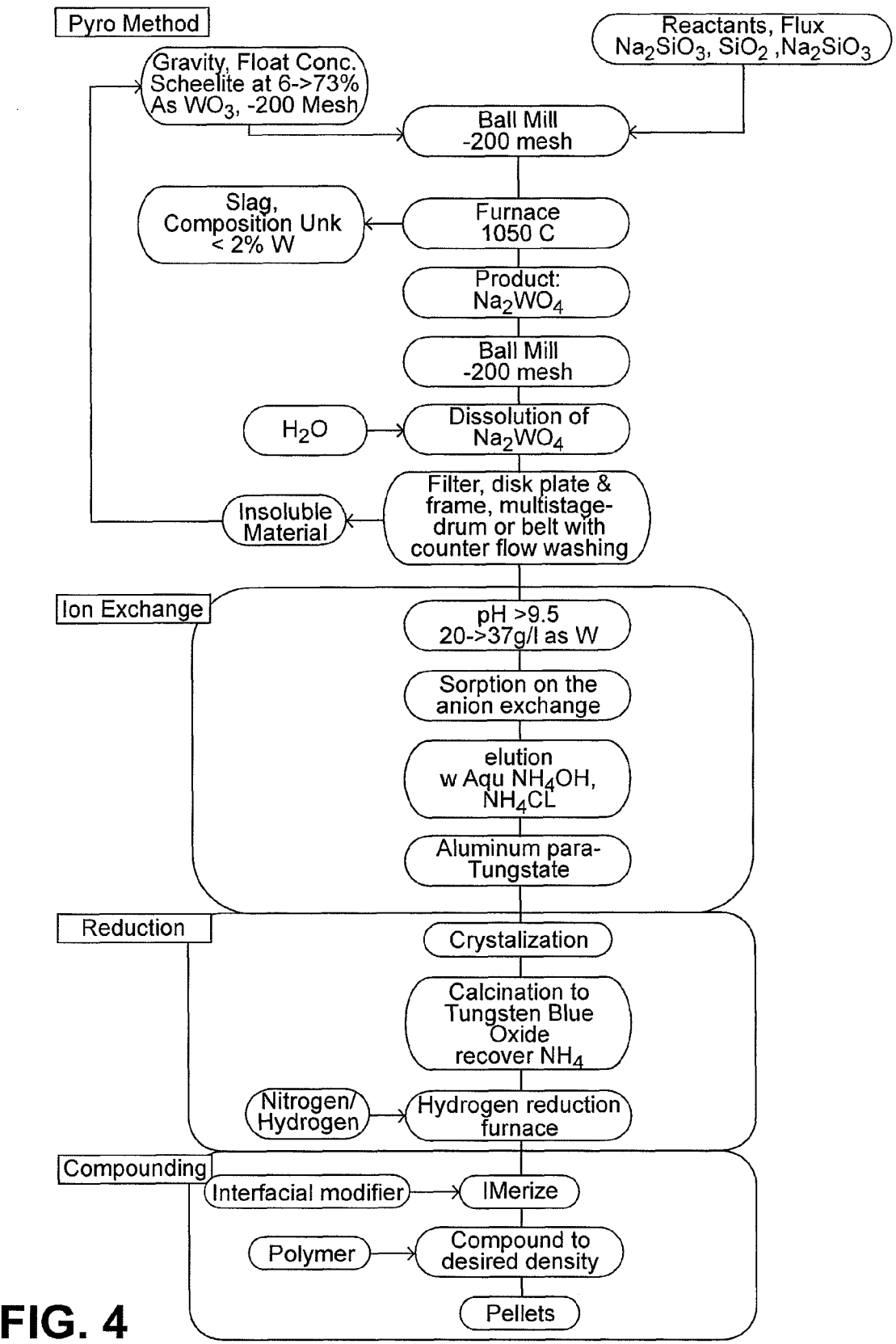
FIG. 4 is an overall flow diagram of the overall process including the melt flux step.

FIG. 4 is a flowchart depicting the overall process for manufacturing the metal polymer composite of the invention beginning with the metal refining process.

Figure 5:
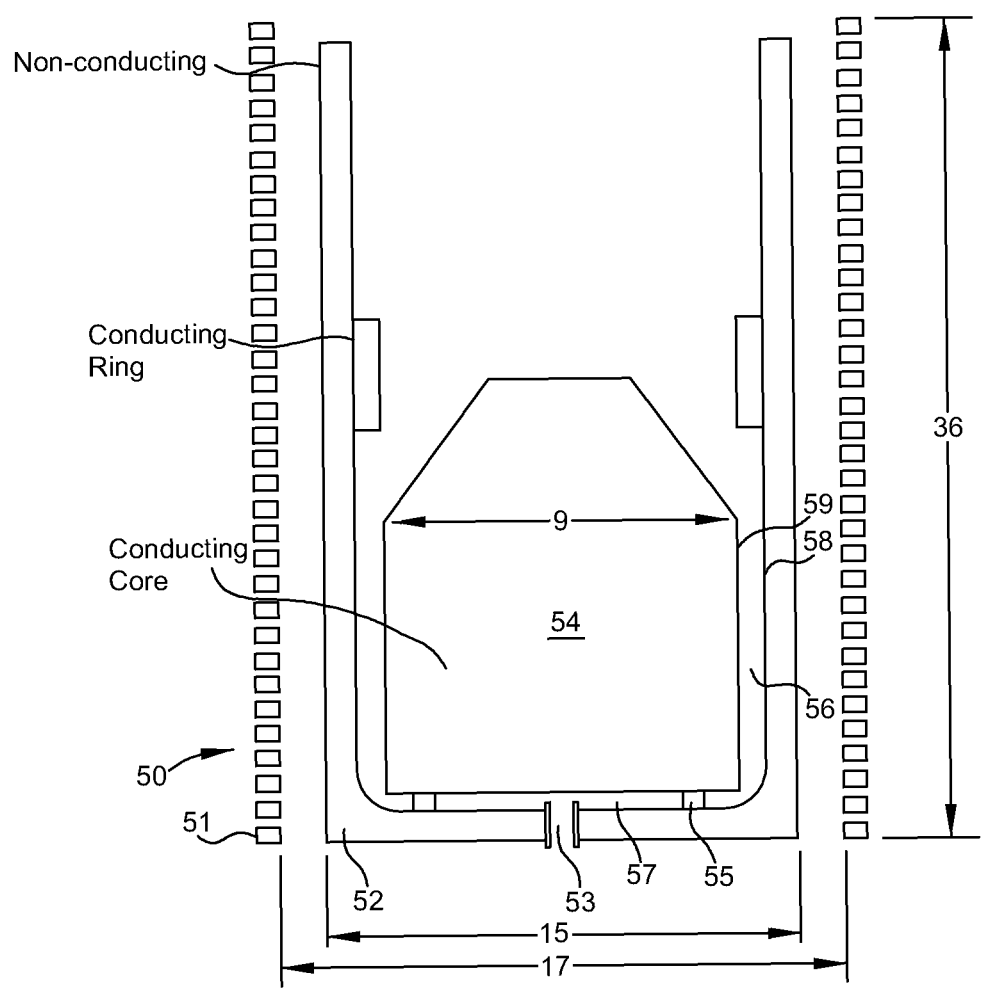
FIGS. 5-7 are schematics of three potential reactor designs.
Figure 6:
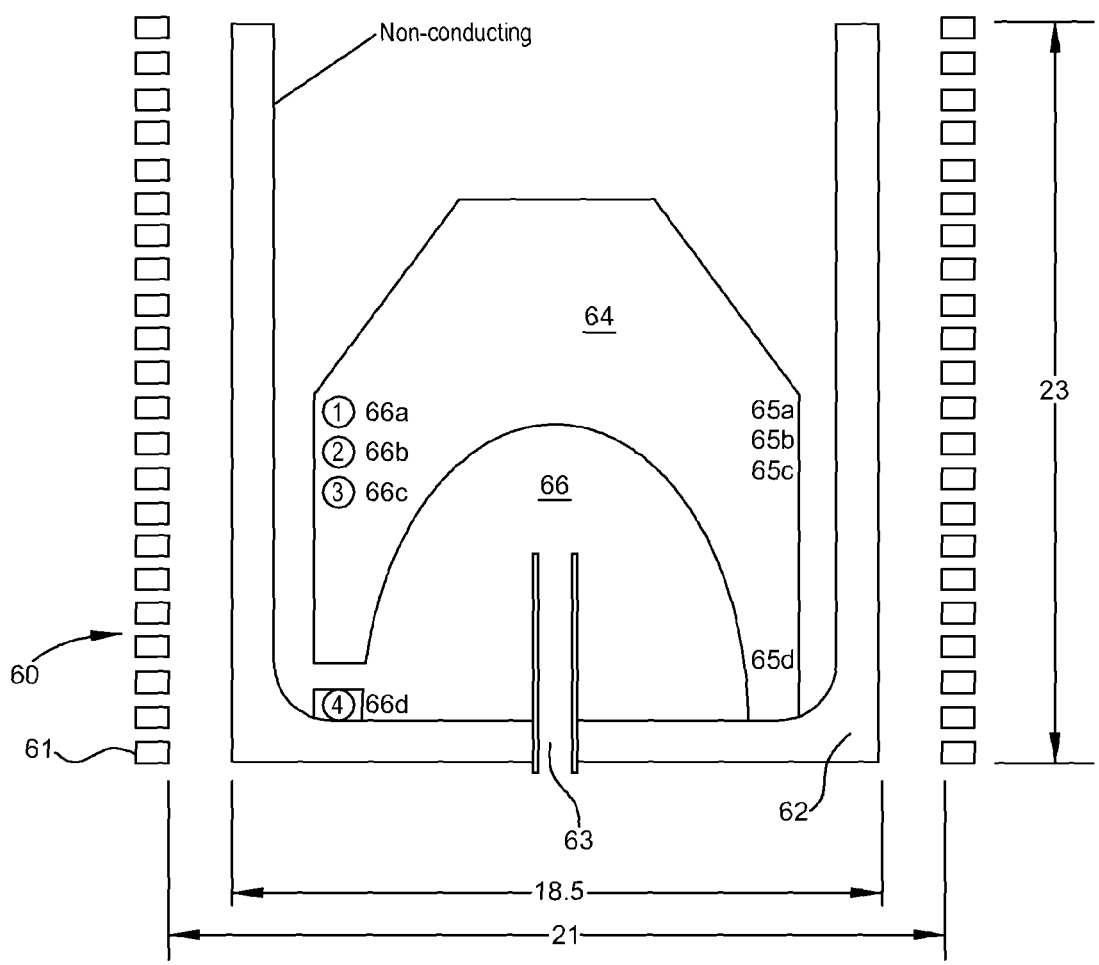
Figure 7:
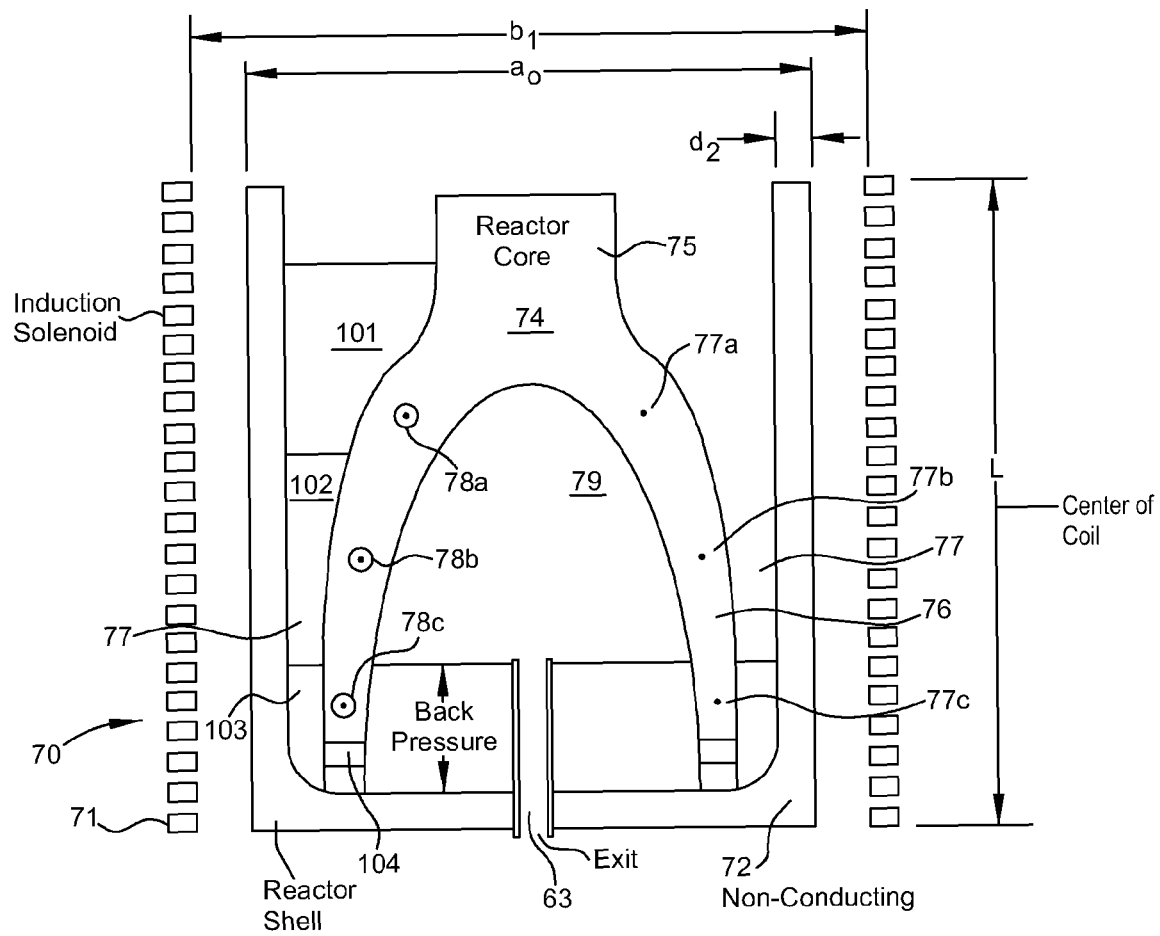

FIGS. 5-7 show a cross-section of useful induction reactor core configurations that can be used beneficially to process the materials of the invention. Each of the reactor structures includes a solenoid or induction heating coil, a non-conductive or conductive vessel with a drain or port, and a non-conductive reactor core that is sized and configured to match the power input to the reactor charge such that the reactor can be operated at a temperature sufficient to fuse and react the charge sufficiently.

FIG. 5 shows one version of a reactor. Reactor 50 generally contains induction solenoid 51, non-conductive or conductive reactive vessel 52 and conductive reactor core 54. Reactive vessel 52 is generally configured with an exit port 53 through which molten liquid can be flowed or removed. The conductive reactor core 54 generally is designed and configured to fit within the non-conductive reactive vessel 52 such that a space 56 is maintained between the inner wall of the reactive vessel 52 and the outer wall of the reactor core 54. This annular space surrounding the core provides a path for passage of the particulate reactor charge. The reactor charge passes along the wall 58 of the reactor vessel and the wall 59 of the core between the core and the vessel in a position such that the reactor charge can be effectively heated by the inductive current present in both the vessel and the reactor core structure. The heat transfer from the reactor core and the vessel into the charge, heats the charge to a molten temperature typically greater than about 700° C. Under the force of gravity, as a result of the temperature of the molten material, the molten material then flows through the annular space 56 to the bottom of the reactive vessel 57. A space between the bottom of the reactor core and the inside surface of the bottom of the reactive vessel is maintained such that the molten flow can continue to the exit port 53 during continuous operations. Conductive core 54 is in the form of a right circular cylinder having a truncated cone upper surface. The truncated cone aspect of the core causes the particulate charge to flow past the truncated cone shape into the space between the core and the vessel. The conductive core is equipped with spacers 55 that maintain a sufficient distance between the bottom of the core and the interior surface of the vessel to permit the flow of molten material in the space between walls 58 and 59 toward and out of opening 53.

FIG. 6 shows a reactor with a refined reactor core. The reactor 60 includes induction solenoid 61, a non-conductive or conductive reactor vessel 62. The non-conductive or conductive reactor vessel has a stand pipe 63 that acts to accumulate molten material in the base of the reactor, but still permits the molten material to flow from the reactive vessel. We have found that the reactor core produces efficient heating if the current is confined into a relatively thin annular section of the core structure. We have found there is essentially zero current flowing at the center of a conductive core in a solid form and that the current flow increases proceeding from the center to the edge of the reaction vessel 62. As a result, the mass at the center tends to be underutilized in terms of heat generation and can be removed. FIG. 6 shows a reactor core 64 having a substantial portion of the center mass of the core removed to isolate the current into the remaining portions of the core. Reactor core 64 has a skirt portion 65. Skirt portion 65 surrounds a central cavity 66 from which core material has been removed to define the skirt portion 65. In skirt portion 65, the currents flow in a circular path around the reactor core. In FIG. 6, the current is at 68a through 68d in a direction that is perpendicular and out of the page. At 69a through 69d, the current is flowing perpendicularly into the page. The current flows in a circular motion around the central hollow space 66 providing a very efficient heating of the core skirt portion 65 while power is being applied to the induction solenoid 61. A plurality of apertures 67 are formed at the base of skirt portion 65 to permit flow of molten liquid into the bottom of the reactive vessel. Molten or fused liquid can accumulate in the bottom of the vessel until it reaches the height of stand pipe 63 at which time it then flows from the reactor vessel to the exterior of the structure.

In an example of how a reactor of the invention, specifically the reactor shown in FIG. 6, may be employed, the following experiment was carried out. A 1 KHz 150 KW Pillar induction power supply was used to power the reactor of FIG. 6. The reactor shell was made from a blend of silicon carbide and graphite (Vesuvius) if a conductive crucible is employed and alumina and/or silica blends for nonconductive applications (Blasch). The core was made from extruded graphite (Graphite Engineering and Sales Co.). A mixture of Tungsten ore, sand, and soda ash was fed into the top of the reactor, and the molten fused product was collected in iron crucibles. A throughput of 400 lbs per hour of mixture of sodium tungstate and soda glass with an melt temperature of 1200° C. was achieved. The mixture can be separated into distinct phases or formed into bricks for further processing.

FIG. 7 is a further example of a reactor core within the reactive vessel. In FIG. 7, the reactor 70 includes an induction solenoid 71, a reactor vessel 72 and a conductive reactor core 74. The conductive reactor core is in a substantially bell shaped form having an upper solid portion 75 and a skirt portion 76 extending from portion 75 defining an interior space 79 within the bell shaped reactor core. Again, the configuration of the reactor core skirt portion defines a conductive structure that provides a circular current path that efficiently heats the reactor core to an effective reaction temperature for the charge placed into the reactor. In FIG. 7, current flow is shown at 77a, 77b and 77c, passing through the skirt in a circular path. The path, as shown in FIG. 7, is perpendicular to and out from the surface of the Figure whereas the current then passes through the skirt and then passes through points 77a, 77b and 77c in the direction perpendicular to, but into the path.

Further, in FIG. 7, is shown a particulate charge 101 within the space between the reactor core 74 and the reaction vessel 72, a reaction zone 102 wherein the components of the charge react, densify and begin to form the products of the invention and a melt zone 103 comprising the molten components of the materials of the invention wherein the reaction can proceed to completion, proceeding through apertures 104 and filling the reactive vessel to the height of the stand pipe 73 with molten reaction product. Since the reaction product has to pass from zone 103 through aperture 104 into the interior space 79 of the reactor core 74, the height of the stand pipe creates a sufficient time for the reaction to come to completion before the material exits the reactive vessel from stand pipe 73.

Figure 8:
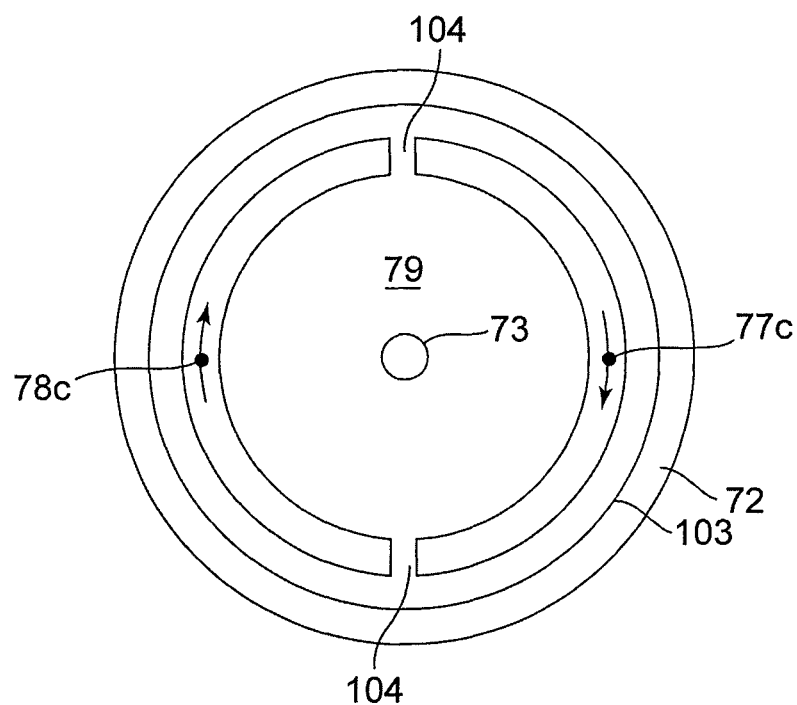
FIG. 8 shows the bottom view of the reactor core of the design of FIG. 7.

FIG. 8 is a diagram depicting the layout of the underside of reaction vessel 72 of FIG. 7. The outer walls of the reaction vessel 72 enclose the bottom of skirt portion 77 of the reactor core 74. Skirt portion 77 is substantially circular, and has apertures 104. Thus, high density reaction products of the molten flux reach the bottom of the reaction chamber in reaction vessel 72 in the molten region 103, through apertures 104, into interior space 79, and eventually exit stand pipe 73.

Referring again to FIG. 7, not only does the shape of the reactor core improve inductive heating of the conductive material of the core, but also provides an improved flow of material through the reactor by shaping the reactor core to match the rate of reaction and the rate the molten material passes through space 77 between the reactor skirt 76 and the non-conductive or conductive vessel 77. The density of the reaction mixture increases as the materials melt, air is excluded, and by-product gases are released. By matching the cross-sectional area of the space between the skirt 76 and the reactive vessel 72, maximum heat and power transfer can be achieved while achieving flow of material by the force of gravity from the top of the vessel through the exit stand pipe 73. To maintain temperature, power draw is adjusted by changing the wall thickness of the reactor core and the lateral position in the induction solenoid. Final reaction time is controlled by adjusting the height of the exit to stand pipe 73. Heating occurs in the reactor core and shell through any current losses. The magnetic field around the current carrying reactor core 74 and reaction vessel 77 results in a temperature rise based on the resistance of the material of construction, frequency of the applied magnetic field, cross-sectional area of the reactor core and its location within the core. The reactor core should be centered within the induction solenoid for high heat production. The reactor shell wall should not be thick when compared to its reference depth. If the reactor shell wall is too thick, a sufficient field cannot form within the interior of the vessel 72 to heat the reactor core 74. In general, the reactor shell wall of the vessel 72 must be less than about 10% of the outside diameter of the vessel to provide sufficient field within the vessel 72 to power and heat the core 74 to the appropriate temperatures.

The material of construction for the reactor vessel 72 and core 74 is chosen to maximize electrical heating efficiency by electrical induction, good thermal stability, resistance to chemical attack and oxidation of the materials. The chemical charge and the result in reaction products should also not substantially modify the materials of the vessel 72 and the core 74. The shape of the reactor core with respect to the vessel 72 is driven by the chemical and physical response of the reaction mixture to the temperature of the core and the power draw from the solenoid. In the beginning, the charge material, usually a powder blend with moderate bulk density, reacts upon heating and contact with the reactor core 74 and vessel 72. As the material begins to react, it increases in density and causes a microcorrosion reaction with nearby components in the charge. As the reaction continues and the temperature rises, the materials fuse and melt. The fluidity, viscosity and density of the material causes the fluid to flow by force of gravity to the bottom of the vessel. The molten material then flows through a plurality of apertures 104 at the base of the core into the bottom of the reactor and accumulate in the bottom of the reactor until they reach the height of the stand pipe 73 and then are permitted to exit the reactive vessel. The time during which the molten materials react within the reactor 70 is set by the depth of the stand pipe 73. The materials will be substantially complete in their reaction after a period of time at which the reaction will tend to slow in an accumulated mass in the bottom of the vessel 72.

Typical induction solenoid or coils can be obtained that operate at a power output of about 10 to about 300 KW at a power frequency of about 1 to about 10 kilohertz. The magnetic field formed by the solenoid flows around the solenoid to form a substantially parallel field within the reactive vessel. The field strength interacts with the conductive portion of the vessel and the reactor core to produce heating. The internal diameter of the induction solenoid is typically about 0.3 to about 1 meter. The height of the solenoid is typically about 0.3 to about 1.5 meter and is substantially circular in cross-section.

The reactor vessels 52, 62 and 72 of FIGS. 5, 6, and 7 can be made of a conductive or non conductive material that can survive the heat produced by the induction coil and the chemical action of the reactants in the reaction while avoiding substantial oxidation at high temperatures. Conductive refractory materials can be used. Preferred materials include carbon, silicon carbide, other metal carbide structures that can be combined with carbon to provide a substantially conductive material with the appropriate resistivity. Resistivity of the material is typically about $1 \times 10^{-4}$ to about $8 \times 10^{-4}$ ohm-inches. Preferably, the resistivity ranges from about 3 to about $300 \times 10^{-4}$ ohm-inches. The thickness of the skirt portion in the reactor core 75 typically ranges from about 1 to about 4 inches, typically about 1.1 to about 3 inches. Such a dimension concentrates the current within the skirt portion for effective heating.

The typical charge to the reactor includes silica, an alkali metal salt and a source of metal. The configuration of the reactor must be such that the reactor reaches a temperature sufficient to fuse the silica, alkali metal salt and source of metal. Such a temperature is typically at least 800° C. and typically ranges from about 950° C. to about 1400° C. At a temperature of about 1050° C. to about 1300° C., the reactive vessel of the invention can typically process sufficient reactor charge such that the reactor will produce about 60 to about 200 kilograms per hour of total reaction product including silica glass and alkali metal metalate.

The reactor vessels of FIGS. 5, 6 and 7 can be run in a batch mode or can be run continuously. In either batch mode or in continuous processing, the silica glass can be combined with the metalate reaction product and can remain physically unseparated in a mixed form. The mixed form can be solidified into processable portions, typically ranging from about 10 pound to 50 pounds in weight and typically are formed into a spherical, oval or cylindrical form. A second option is to continuously crush the material out of the bottom of the furnace. After formation and cooling, the solid mixture can then be ground into a particulate having a major diameter less than about 1 centimeter, preferably less than about 1 millimeter, often passing a 10 mesh screen. The ground material is then contacted with water and the sodium salts are solubilized and removed from the insoluble silica component. The silica component contains virtually all impurities leaving a soluble component that is typically substantially pure metalate.

Alternatively, the molten material flowing from the reactor either in a batch mode or a continuous mode can be separated into a silica glass phase and a metalate phase upon exiting the reactor. The molten material can be introduced into a crucible wherein it forms a separate glass and metalate phase. The materials can be removed from the crucible after cooling and can be easily mechanically separated. One mode of mechanical separation involves crushing the materials into relatively small but manageable particulates. The highly dense metalate can then be separated due to substantial differences in density to a metalate portion and a silica portion.

The molten material can also be separated using a porous separation plate. We have found that a graphite plate having a random array of apertures can act as a separating surface. The glass phase tends to not wet the graphite portion and tends to be retained on the surface of the circular portion. The metalate material tends to wet the graphite portion and then rapidly passes through the perforate portions of the plate effecting a clean and substantial separation of the glass phase from the metalate phase.

The reactor of the invention can be used in three types of reaction schemes. In one embodiment of the invention, the reaction scheme is a vitrification process in which material particulate can be fused within a glass to isolate the particulate contents from the environment. In such a reaction, the reactor is used primarily to fuse silica into a glass and cause the particulate, in a reacted or unreacted state, to form within the vitrified glass, encapsulating the particulate within the glass structure isolating the particulate from the environment. This process is primarily thermal.

In another embodiment of the invention we have found that one component of the reaction product is a calcium metalate due to the presence of calcium salts in most metal sources. We have found that as the water extracts the soluble sodium metalate salts from the particulate grind, that the substantially insoluble calcium metalate forms a fine precipitate that is removed with the sodium metalate solution and can be then collected and returned to the reactive vessel for further processing in order to recycle all metalate into the reactor for the purpose of ensuring that all metalate is ultimately converted into soluble sodium or other alkali metal salts.

In another embodiment of the invention, we have found that the sodium metalate tends to act as a solvent for any other metalate salt for purification purposes, thereby broadening the utility of the invention to include other metals that may be purified using this embodiment of the invention. In yet another embodiment of the invention, sodium metalate may be used as a reaction medium. In a process for the purpose of removing high value material from a low grade source, the sodium metalate material of the invention can act as a reaction medium or solvent. If the source has a reactive metal component, the sodium metalate can be contacted with the source and can cause a reaction within the metal source to form a second metalate species that can be absorbed into and carried with the reaction medium. Alternatively, the alkali metal metalate material of the invention can act as a solvent material. High value materials within a source can be contacted with the sodium metalate material. High value materials within the source can then become solubilized in and carried with the metalate material as a solvent and, once removed from the source, can then be further purified into high value materials.

In an example of the above embodiments, we have found that by using the sodium metalate product of the invention, noble metals such as gold, silver, platinum and iridium can be extracted from a low value source by contacting the source with the metalate. Any substantial quantity of noble metal that is unoxidized in the reaction mixture will be soluble in, and will be separated with, the melt from the source material. Once removed, the metalate can be easily processed to remove the noble metal species from the metalate.

One substantial advantage of the processes of this invention is that winning of metal from low value sources for the production of metals such as tungsten, tantalum, niobium, palladium and other similar metals can commercially be obtained using the reaction or extraction mode using sodium metalate of the invention. Since we have found that after the reaction is complete, the silica glass phase can be separated from the metalate phase and that the reaction of the invention can rapidly concentrate, even a low concentration of metal in a low quality ore metal source results in the efficient formation of substantially pure metalate phase. As a result, even tailings from ore production mining or metal winning can be a valuable source of metal for further processing when employing the methods of the invention.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A reactor structure comprising a flow-through reactor for forming a purified sodium tungstate salt phase and separating the salt phase from a glass flux phase, the reactor structure comprising:
   (a) an induction coil and a reactor vessel, the reactor vessel free of electrical heating positioned in the interior of the induction coil, the reactor vessel having a stand pipe used to control flow-through reaction time by accumulating and then permitting a flow of the purified sodium tungstate, the stand pipe having a circular diameter of about 1 to about 10 centimeters;
   (b) a heating component consisting of a conductive graphite or graphite composite reactor core positioned within the reactor vessel, the conductive reactor core comprising a top portion and extending downward from the top portion, a substantially cylindrical wall defining an internal void volume, the conductive reactor core structure having a height of about 20 to about 200 centimeters and an internal space having a radius of about 25 to about 130 centimeters, the downwardly extending cylindrical walls having an annular thickness of about 2 to about 10 centimeters;
   (c) the reactor structure comprises a reactor-flow space positioned between the reactor core and the interior surface of the reactor vessel and the reactor-flow space having an annular thickness of about 2 to about 10 centimeters and is less than 10% of the outside diameter of the vessel; and
   (d) a charge of reagents comprising a source of tungsten comprising an ore having a particle size of about 10 to 300 microns and an alkali metal metalate in particulate form at the top of the reactor vessel;
wherein the charge of reagents and the reactor vessel are inductively heated by the conductive reactor core with power from the induction coil to a temperature greater than about 700° C. sufficient to produce an alkaline micro-corrosion of the source of tungsten resulting in a liquid glass flux phase separate from a phase comprising greater than 90% purified liquid sodium tungstate salt, substantially free of soluble sulfur that flows through the reactor and exits the reactor vessel.

2. The reactor structure of claim 1 wherein the induction coil has a power output of about 50-2000 KW at about 1-10 KHz.

3. The reactor structure of claim 1 wherein the nonconductive vessel comprises a silicon carbide-carbon composite or zirconium.

4. The reactor structure of claim 1 wherein the conductive reactor core comprises graphite or a graphite composite comprising greater than 30 wt.-% graphite.

5. The reactor structure of claim 1 wherein the nonconductive vessel is a substantially a right cylindrical vessel.

6. The reactor structure of claim 1 wherein the reactor structure is sized and configured to operate at a power of 10 to 300 kilowatts at about 500 to 10,000 hertz with a flow through rate of about 10 to about 400 kilograms per hour at a reaction temperature at a point within the reactive vessel of greater than 700° C.

7. The reactor structure of claim 1 wherein the reactor core center of mass is positioned at approximately the center of the induction coil.

8. The reactor structure of claim 1 wherein reagents are introduced into the reactor structure in particulate form at the top of the reactor vessel.

9. The reactor structure of claim 8 wherein the reagents inside the nonconductive vessel are inductively heated by the induction coil to a temperature sufficient to form a liquid product.

10. A reactor structure comprising a flow-through reactor for forming a purified sodium tungstate salt, the reactor structure comprising:
   (a) an induction coil and a reactor reaction vessel positioned in the interior of the induction coil, the reactor vessel having a fluid stand pipe used to control flow-through reaction time by accumulating and then permitting a flow of the purified sodium tungstate by generating a back pressure, the stand pipe having a circular diameter of about 1 to about 10 centimeters;
   (b) a heating component consisting of a conductive graphite or graphite composite reactor core positioned within the reactor vessel, the conductive reactor core comprising a top portion and extending downward from the top portion, a substantially cylindrical wall, the conductive reactor core structure having a height of about 20 to about 200 centimeters, the downwardly extending cylindrical walls having a thickness of about 2 to about 10 centimeters;
   (c) the reactor structure comprises a reactor-flow space positioned between the reactor core and the interior surface of the reactor vessel, and the reactor-flow space having an annular thickness of about 2 to about 10 centimeters and is less than 10% of the outside diameter of the vessel; and (d) a charge of reagents comprising a source of tungsten comprising an ore having a particle size of about 10 to 300 microns and an alkali metal metalate in particulate form at the top of the reactor vessel;

wherein the charge of reagents and the nonconductive vessel are inductively heated by the conductive reactor core with power from the induction coil to a temperature greater than about 700° C. sufficient to produce an alkaline micro-corrosion of the source of tungsten resulting in a liquid flux phase separate from a product phase comprising greater than 90% purified liquid sodium tungstate salt, substantially free of soluble sulfur, that flows through the reactor and exits the vessel.

11. The reactor structure of claim 10 wherein the induction coil has a power output of about 50-2000 KW at about 1-10 KHz.

12. The reactor structure of claim 10 wherein the reactor vessel comprises a silicon carbide-carbon composite or zirconium.

13. The reactor structure of claim 10 wherein the conductive reactor core comprises graphite or a graphite composite comprising greater than 30 wt.-% graphite.

14. The reactor structure of claim 10 wherein the reactor vessel is a substantially a right cylindrical vessel.

15. The reactor structure of claim 10 wherein the reactor structure is sized and configured to operate at a power of 10 to 300 kilowatts at about 500 to 10,000 hertz with a flow through rate of about 10 to about 400 kilograms per hour at a reaction temperature at a point within the reactor vessel of greater than 700° C.

16. The reactor structure of claim 10 wherein the reactor core center of mass is positioned at approximately the center of the induction coil.

17. The reactor structure of claim 10 wherein reagents are introduced into the reactor structure in particulate form at the top of the reactor vessel.

* * * * *